United States Patent [19]
Herrmann

[11] 3,870,390
[45] Mar. 11, 1975

[54] FURNITURE CONSTRUCTION

[76] Inventor: Frederick H. Herrmann, 3015 Lakehaven Ct., Ann Arbor, Mich. 48105

[22] Filed: July 23, 1973

[21] Appl. No.: 381,855

[52] U.S. Cl............... 312/263, 52/285, 52/753 T, 108/153, 312/111
[51] Int. Cl........................................... A47b 47/00
[58] Field of Search ................... 312/263, 257 R, 312/257 SK, 257 SM, 111, 140, 195, 198; 52/753 T, 753 F, 753 J, 584, 582, 285; 211/177; 108/152, 153; 403/340, 339, 376

[56] References Cited
UNITED STATES PATENTS

| | | | |
|---|---|---|---|
| 419,920 | 1/1890 | Campbell | 312/263 X |
| 3,381,636 | 5/1968 | Saiberlich | 108/152 |
| 3,427,669 | 2/1969 | Swenson | 312/263 X |
| 3,547,472 | 12/1970 | Ehrman | 52/285 |
| 3,664,011 | 5/1972 | Labastrou | 52/753 T |
| 3,680,898 | 8/1972 | Hermann | 52/285 |
| 3,747,885 | 7/1973 | Ciancimino | 312/263 X |

FOREIGN PATENTS OR APPLICATIONS

| | | | |
|---|---|---|---|
| 916,596 | 1/1963 | Great Britain | 312/263 |

*Primary Examiner*—James T. McCall
*Attorney, Agent, or Firm*—Barnes, Kisselle, Raisch & Choate

[57] ABSTRACT

A furniture assembly combination which includes component panels to be assembled together in positions normal to each other and a hardware assembly composed of a receptacle bar and a support bar, each with the same or complementary cross-section to interfit with angled bearing surfaces in contact to draw the parts together. One element of the hardware is recessed in a panel and the other element projects from another panel so that the parts interfit to rigidly join the panels.

2 Claims, 17 Drawing Figures

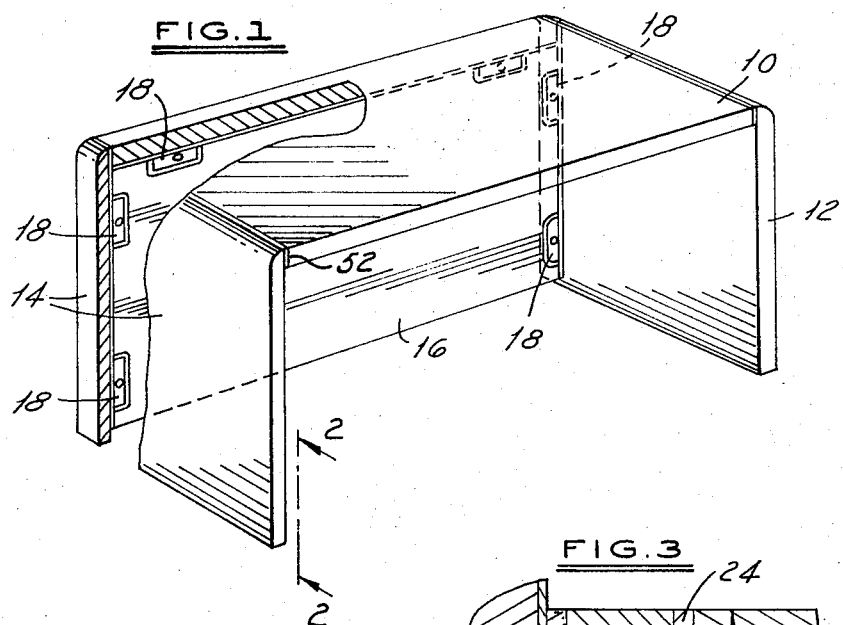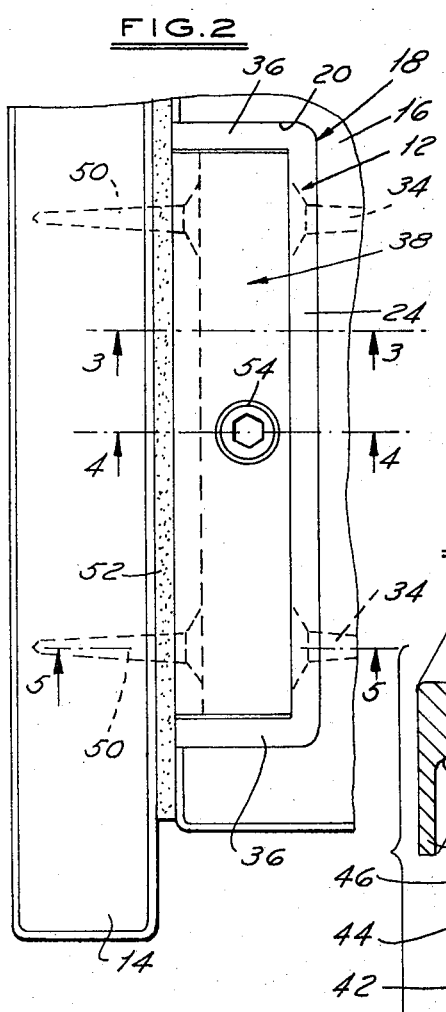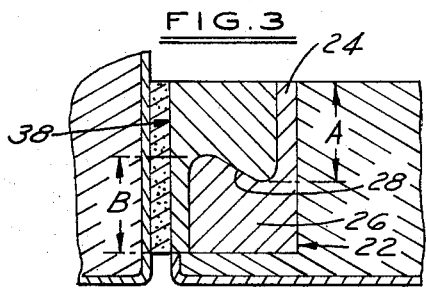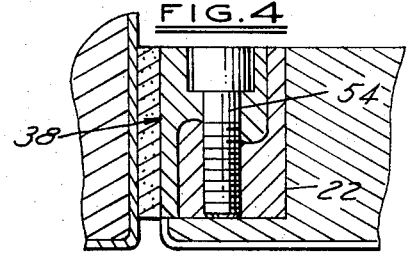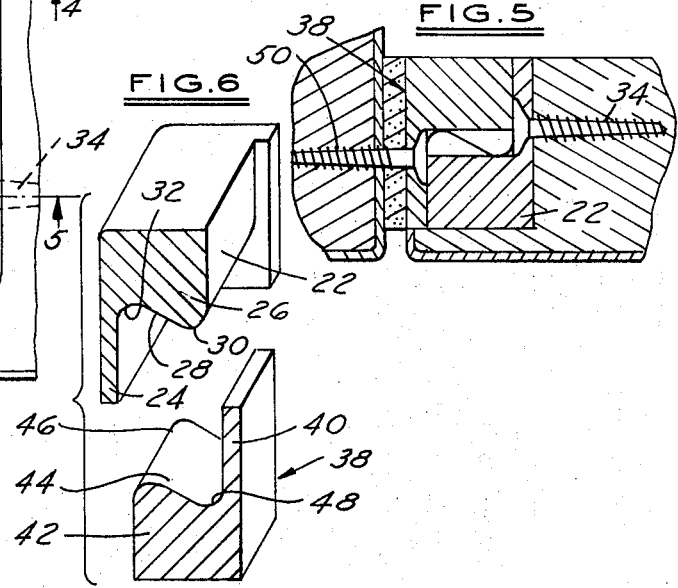

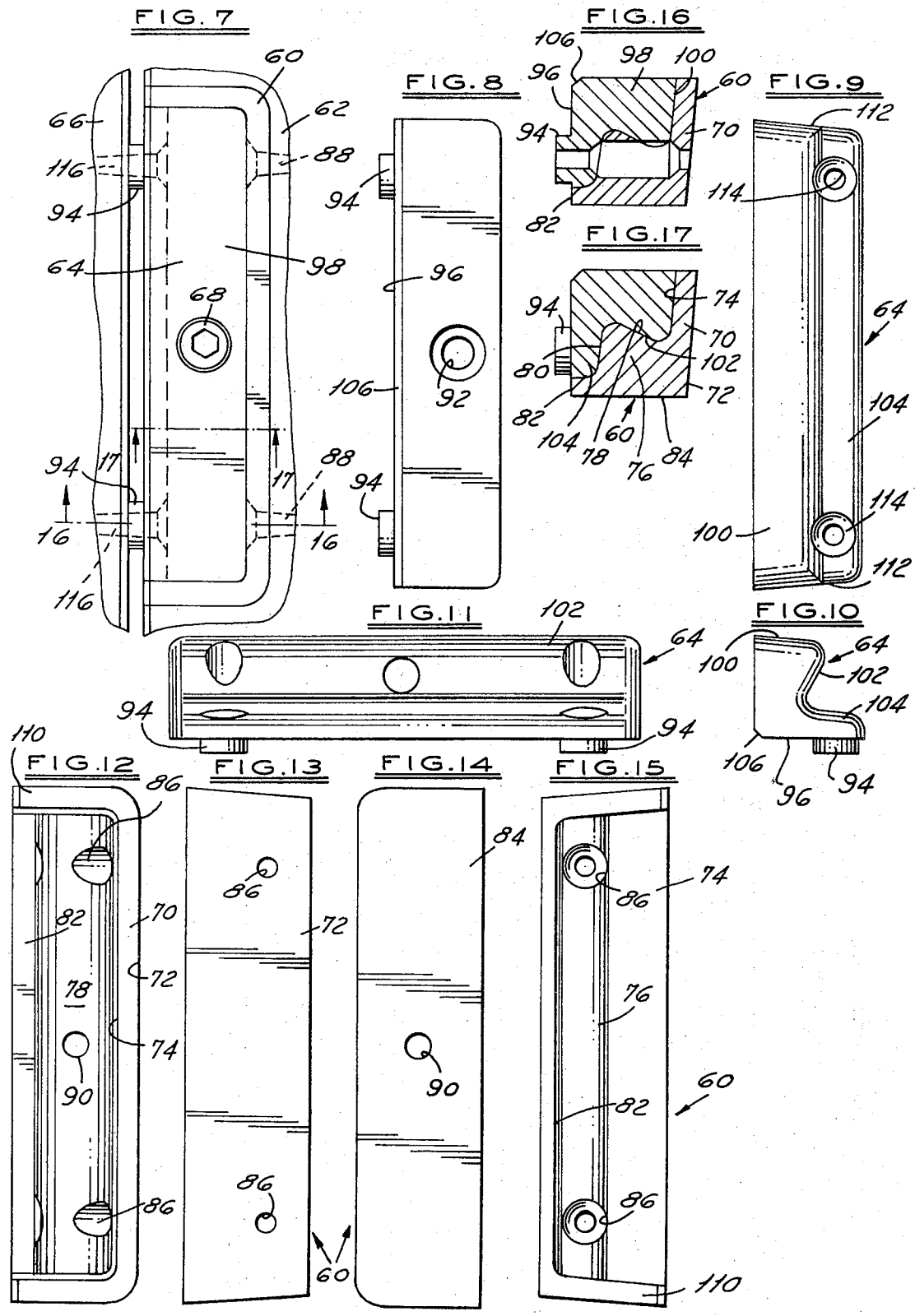

FURNITURE CONSTRUCTION

This invention relates to a Furniture Construction and more particularly to an attaching device at mounting furniture panels relative to each other to create furniture modules from standard panel components.

It is an object of the invention to provide fastening hardware which can be mounted on respective components to facilitate the assembly of parts.

It is a further object of the invention to provide hardware elements to fit together in a complemental way so that they are self-aligning and dimensioned to form a rectangular unit in assembly.

It is another object of the invention to provide a system in which the parts are designed such that they will interfit without injury to the panels as they are assembled.

It is a further object to provide hardware elements which can be formed from, but not necessarily limited to, the same extruded bar and interfitted in assembled relation.

Other objects and features of the invention will be apparent in the following description and claims in which the principles of operation and use are outlined in connection with the best mode presently contemplated.

DRAWINGS accompany the disclosure and the various views thereof may be briefly described as:

FIG. 1, a view of a furniture assembly made up of components.

FIG. 2, an enlarged view of an assembly of the retaining units.

FIGS. 3, 4 and 5, sectional views, respectively, on lines 3—3, 4—4 and 5—5 of FIG. 2.

FIG. 6, a sectional view showing a perspective cross-section of the parts in separated position.

FIG. 7, an illustration of an assembly of a modified construction having the same basic principles with certain modifications in the form.

FIG. 8, a view of a support bar of the new modification.

FIG. 9, a view of a support bar.

FIG. 10, an end view of FIG. 9.

FIG. 11, a view of the supporting surface of the support bar.

FIG. 12, a view of the supporting surface of the receptacle bar.

FIG. 13, a view of the outside surface of the base plate of the receptacle.

FIG. 14, a view of the bottom surface of the support receptacle.

FIG. 15, a view looking into the receptacle toward the base.

FIG. 16, a sectional view of the assembled parts on line 16—16 of FIG. 7.

FIG. 17, a view of the assembled parts on line 17—17 of FIG. 7.

REFERRING TO THE DRAWINGS

In FIG. 1, there is shown a furniture component in the form of a desk which is assembled from a top component 10, end components 12 and 14, and a skirt component 16. The assembling hardware is shown generally at 18 in FIG. 1, an enlarged view being illustrated in FIG. 2. Certain of the panels are formed with recesses 20 for receiving what may be referred to as a receptacle bar 22. This bar is composed of a base plate 24 and a ledge block 26 which extends outwardly from one portion of the base plate and which is provided with a bearing surface 28 disposed at an acute angle to the base plate. The corners of the unit are curved at 30 and 32 so that the surface 28 blends into the curved portions.

As shown in FIG. 3, the free dimension of the base plate at A is equal to the dimension B which is the greatest cross-sectional dimension of the ledge block 26. The receptacle bar 22 is intended to be mounted in the recess 20 by fastening screws 34 which mount in the panel 16 containing the recess. The receptacle bar is preferably provided with end plates 36 which extend outwardly from the base plate 24 to form an oblong receptacle at each end of the ledge block.

Another component 14 of the assembly carries on one surface a support bar 38 which has a configuration in cross-section identical with the cross-section of the receptacle bar, it being composed of a base 40 having extending from a portion thereof a lodging block 42 having a bearing surface 44 at an angle to the base plate and rounded surfaces 46 and 48. This support bar is held to the panel 14 by suitable screws 50 and, if desired, a spacer strip 52 may be utilized for decorative purposes. When the parts are assembled as shown in FIGS. 3, 4 and 5, it will be noted that the bearing surfaces are in complemental juxtaposition and held tightly together by a screw 54. The fact that the dimensions A and B are identical results in a rectangular assembly block unit which provides a very neat appearance. The angle of the bearing surfaces 28 and 44, acute to the base plates, is such that when the parts are assembled, they will "snug-in" to a tight fit position even without the holding screw 54; and, accordingly, even if the screw should for some reason become loose, the parts will still tend to retain in the proper position. If the end plates 36 are provided on the receptacle bar, they facilitate the insertion of the support bars to prevent marring of the furniture surfaces.

The identical cross-section of the receptacle bar 22 and support bar 38 makes it possible to extrude the bars and cut them from the same stock. The dimensions are such that the bars interfit in the selfassembling manner above described. The end plates 36 can be fastened on by screws or by a suitable adhesive or even formed around from the base plate after milling away a portion of the receptacle bar at each end.

With reference to the embodiments shown in FIGS. 7 to 17, FIG. 7 shows an assembly of a modified construction. A receptacle bar 60 is assembled to a panel 62 and a support bar 64 is assembled to a panel 66, the bars being interfitted and held in place by a socket head screw 68. The receptacle bar is shown in cross-section in FIGS. 16 and 17 and the various views thereof are also shown in FIGS. 12 to 15. The bar consists of a base 70 having an outside surface 72 illustrated in FIG. 13 and an inside surface 74 substantially parallel to the outside surface. The receptacle bar, as a two-step ledge block, consists of a first step portion 76 having an angled surface 78 which is disposed at an acute angle to the general plane of the base 70, this surface terminating in radiused portion, the outside of which merges into a riser surface 80 terminating in a second step 82 to provide a foot ledge spaced downwardly from the bearing surface 78. The bottom 84 of the receptacle bar is illustrated in FIG. 14; and FIGS. 12 and 15 illustrate the screw openings 86 which are provided for screws 88 to hold the receptacle bar in a recess within a furniture element 62. A hole 90 for screw 68 is also illustrated in FIGS. 12 and 14.

The support bar which is intended to nest in the recess of the receptacle bar is illustrated in FIG. 8 having a hole 92 for screw 68 and spacer lugs 94 are provided on a surface 96 of the support bar to space the assemblies as shown in FIG. 7. These spacers are optional and, if desired, they may be omitted or a stripped spacer provided as illustrated in the previously described FIG. 2. The supporting bar has a top surface 98 as illustrated in FIG. 16 and opposite the surface 96 is a surface 100 which is complemental to the inside surface 74 of the receptacle bar.

The surface 74 ends in a radiused portion which leads to a support surface 102 complemental to the support surface 78 of the receptacle bar. The surface 102 terminates also in a radiused portion which, as viewed in FIG. 17, descends in a toe portion 104. Thus, it will be seen that the bearing surfaces of the support bar are complemental to the inside surfaces of the receptacle bar and the parts are held securely together by the bolt 68. A corner of the support bar between the surfaces 96 and the top surface is angled at 106.

It will be noted that the receptacle bar has end portions 110 which are angled slightly to provide a taper which facilitates removal of the part from an injection mold and also enhances the self-centering characteristics of the two parts as they are moved together. This taper also allows the use of tapered router bits which are easier to utilize in a wood cut and produce cleaner edge cuts. The taper also makes it easier to insert the part into a routed area of a furniture panel. It will also be seen that with the receptacle bar shaped as illustrated in the cross-section in FIG. 16, there is a complete concealment of the routed area of the panel and this not only adds to the appearance prior to assembly but also protects the panel from pressure which might otherwise be caused by foreign objects such as dirt or glue that might be in the opening when the support bar was inserted into place.

It will be noted in FIG. 9 that the ends of the support bar are also angled at 112 also to facilitate removal from a mold and to facilitate insertion into the receptacle bar. Holes 114 are utilized for screws 116 to hold the support bar on to a section of furniture 66.

It will be seen when the receptacle bar is mounted in a routed recess in an element of furniture, the recess is completely covered and the tapered recess provided by the end walls and the supporting surfaces facilitates the assembly of the supporting bar into the receptacle where it will nest and lock by reason of the complemental angled surfaces. The parts may be secured by the single screw 68.

I claim:

1. In a furniture assembly comprising a plurality of panels to be joined, one normal to the other, that improvement which comprises:
   a. a first panel having a plurality of short recesses opening to a converging side and edge thereof,
   b. a receptacle bar secured in each of said recesses, each receptacle bar comprising a base plate to lie against the base of a recess, end plates normal to said base plate to extend to a terminal surface at the edge of the said first panel, and a ledge block extending from said base between said end plates having a bearing surface extending lengthwise between said end plates parallel to said base and lying in a plane disposed at a predetermined acute angle to said base, said block terminating at a face a predetermined distance away from said base and spaced within the terminal surfaces of said end plates,
   c. a second panel having side walls and edge walls,
   d. a support bar projecting from a wall of said second panel having a bar base plate secured to said second panel parallel to an edge wall thereof to fit within free space between the ends of said receptacle bar and a lodging block extending in cross-section outwardly from said bar base plate and longitudinally along said base plate having one bearing surface lying in a plane disposed at said same predetermined acute angle to said bar base plate, and
   e. means transfixing said bars serving to secure said bars together with said bearing surfaces in complemental juxtaposition to hold said panels in tight engagement.

2. A hardware assembly for use in fastening panels of furniture together in a rigid construction which comprises:
   a. a receptacle bar to be secured in a receiving recess of one element of a piece of furniture comprising a base plate having a front and back surface and end plates at right angles to said base plate extending from said front surface, a two-step ledge block extending from said front surface of said base plate to a plane spaced inwardly from the free edges of said end plates, having a first step serving as a bearing surface lying along said base plate in a plane disposed at an acute angle to said base and merging with said front surface, and a second step lying in said plane substantially parallel to the plane of said base,
   b. a support bar having a support plate to be secured to a second element of a piece of furniture and to interfit between the ends of said receptacle bar along said plane, and a bearing surface complemental to said first step of said receptacle bar to lie in contact therewith and to fill the remainder of the space between said ends, and
   c. means to transfix said bars to secure the respective bearing surfaces of said bars together in load bearing relation.

* * * * *